INVENTOR
LOUIS J. GALLO
BY Lyon & Lyon
ATTORNEYS

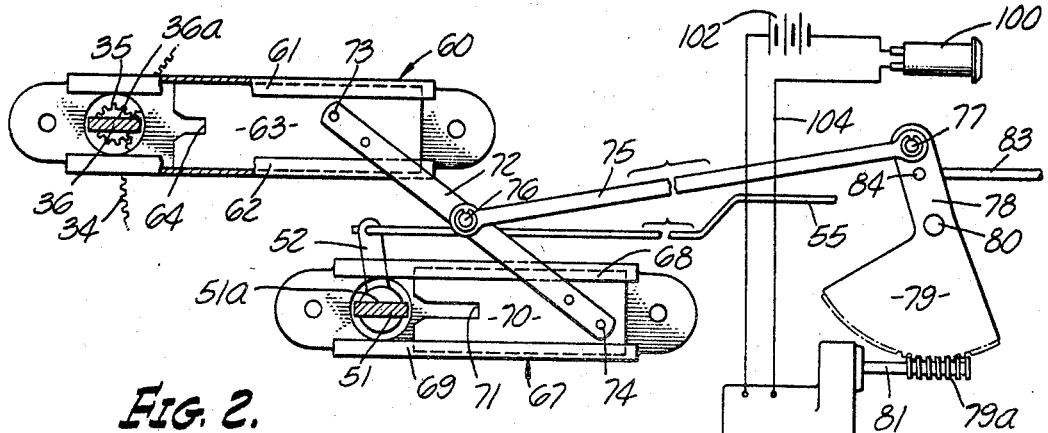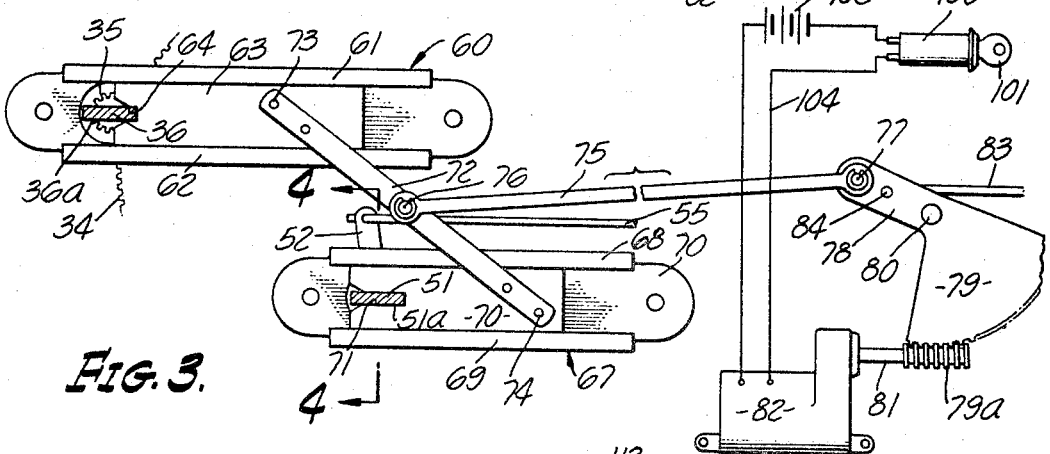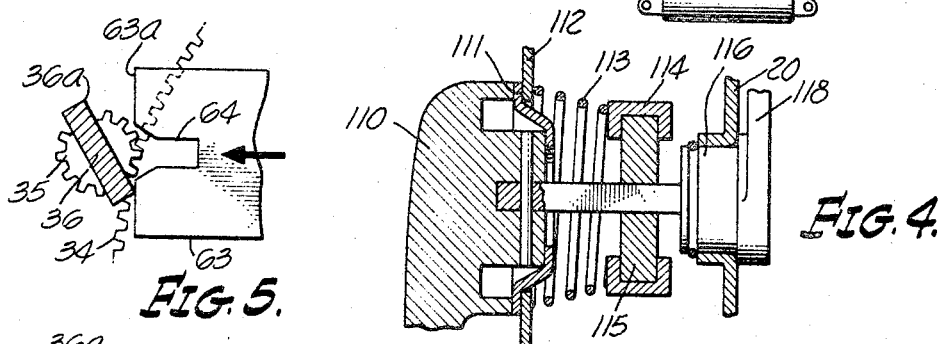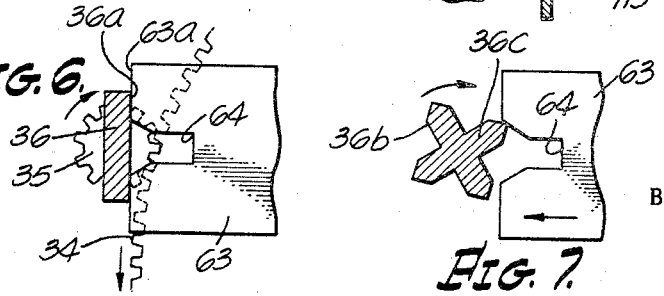

A United States Patent Office 3,435,645
Patented Apr. 1, 1969

3,435,645
AUTOMOBILE DOOR AND WINDOW
SAFETY LOCK
Louis J. Gallo, Las Vegas, Nev., assignor of thirty-three and one-third percent to Peter Epsteen, Chicago, Ill.
Filed Sept. 28, 1967, Ser. No. 671,261
Int. Cl. B60r 25/00; F16c 3/00
U.S. Cl. 70—183                    5 Claims

ABSTRACT OF THE DISCLOSURE

A device for incorporation with the operating mechanism of an automobile door and window to lock the same, which door and window are each controlled by the turning of a separate rod or shaft characterized by modifying the door and window operating shafts by flattening a portion of each; providing a pair of slides each having an open bifurcated end or a flattened end, one for each of such shafts; guide means for each of said slides and means for connecting said slides to an electromotor for movement into locking or unlocking position and means for interconnecting said door latching means to the conventional push rod for additional latching of the door operating latch.

---

This invention relates to an automobile door and window safety lock.

This invention is designed to provide a safety lock for the door and window of a motor vehicle controlled entirely by the door locking key in which the window may be locked in any desired position and in which after being locked neither the door or window can be unlocked by turning of any of the conventional handles even to the breaking point, as the entire unlocking feature is under the control of an electrically driven mechanism dependent upon the proper turning of a key in the door lock.

Automobile theft or theft from automobiles is a serious modern problem. Various solutions for more securely locking the doors and windows have been suggested, but nearly all such can still be forced by applying a breaking or near breaking force to the handles.

Accordingly, it is the prime object of this invention to provide a safety lock for the door and window of a vehicle in which the locking is secured independently of the handles, by electrically operated devices under sole control of the key.

It is a further object of the invention to provide such a device in which the window can be locked in a partly open position.

These and other objects, features and advantages will be apparent from the annexed specification in which:

FIGURE 2 is a diagrammatic position view of the mechanism of the invention in the unlocked position;

FIGURE 3 is a diagrammatic position view of the mechanism of the invention in the locked position;

FIGURE 4 is a transverse section through the door lever as taken along the line 4—4 of FIGURE 3;

FIGURE 5 illustrates the mechanism in relation to the window crank shown in a partially open position;

FIGURE 6 shows it in the subsequent locked position; and

FIGURE 7 shows a modification of the locking shaft.

Figure 1:
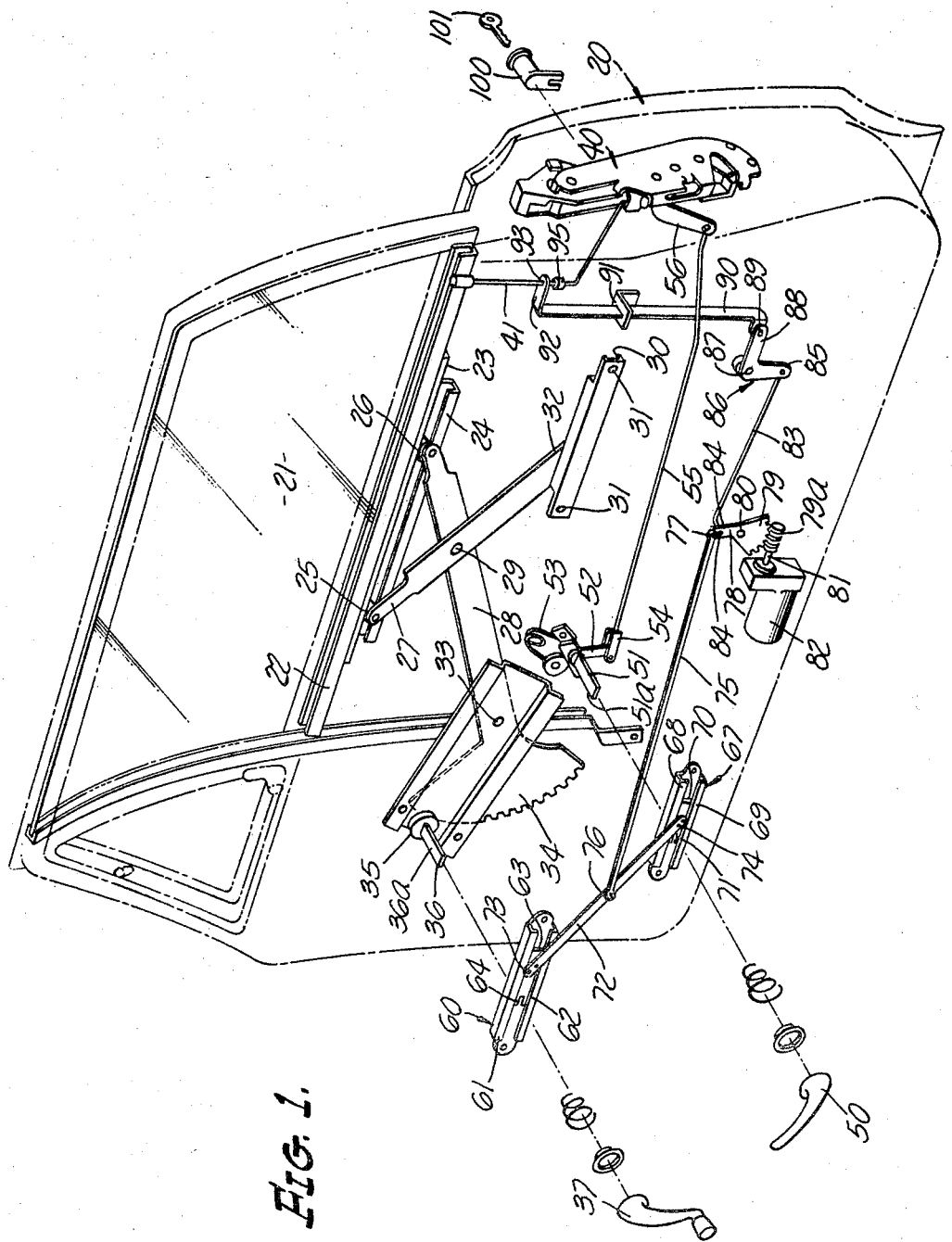
FIGURE 1 is an exploded perspective elevation of an automobile door with interior finished panel removed to illustrate the present invention.

Referring now more particularly to the drawings and particularly to FIGURE 1, there is shown a typical automobile door with the inner finishing panel removed and with parts shown in an exploded view with the present invention applied thereto. Such a door 20 conventionally is provided with a window 21 carried in a channel 22 which in turn mounts a bracket 23 which carries an open channel 24 in which ride a pair of rollers 25, 26 respectively carried on the ends of crank arms 27 and 28 pivoted together as at 29 and supported by a roller, not shown, in a channel 30 permanently affixed as by rivets 31 to the inner side of the door frame, which roller is mounted upon the free end 32 of the crank arm 27. Crank arm 28 is pivoted to the frame of the door as at 33 and the forward end thereof is formed into a gear segment 34. A gear 35 mounted on the end of a rod 36 is conventionally adapted to be rotated by a handle 37 to raise and lower the window 21. As so far described the mechanism is conventional and as will be readily understood a rotation of the gear 35 by turning the rod 36 by means of the handle 37 will cause a movement of the segment 34 which will raise or lower the window 21 because of the cooperation of the rollers 25 and 26 in the channel 24, the unseen roller on the end 32 of the arm 27 and the pivot 29 connecting the arms 27 and 28 which thus forms a parallel operating mechanism. Also conventionally carried by such a door is a lock for the door including a mechanism 40 which incorporates the latch. A push rod 41 which overrides the latch and dogs it in the closed position so as to prevent the opening of the door from the outside when the push rod 41 is depressed, as would be done by the conventional handle (not shown) in the absence of such push rod. Also connected with the conventional door is an inner door operating handle 50 which turns a shaft 51 to operate a bell crank 52 against the force of a spring 53 to one end of which bell crank 52 is pivoted a bifurcated member 54 attached to a rod 55 which operates the latch 56. Again, all of the foregoing mechanism is conventional.

The apparatus of this invention is designed to prevent unauthorized opening of either the window or the door when the door is locked by the key and for this purpose the auxiliary mechanism of this invention is employed without any radical change in the conventional door and window mechanism above-described. This auxiliary mechanism is as follows:

Mounted on the inner side of the door is a channel 60 having a downwardly turned flange 61 and an upwardly turned flange 62 in which channel is mounted a slide bar 63 which has a bifurcated end 64, which bifurcated end 64 is arranged in one position to receive and latch against rotation of the gear 35 and consequently any operation of the window mechanism. The slide bar 63 is designed in its other position to move clear of the flattened portion 36A of the rod 36 so as to permit normal operation of the window mechanism. Likewise mounted on the inside of the door is a channel 67 having a downwardly turned flange 68 and an upwardly turned flange 69 in which is mounted a slide bar 70 having a bifurcated end 71 adapted in one position to receive and latch against rotation flattened portion 51A of the shaft 51, thereby to prevent rotation of the bell crank 52 and thus lock the latching member 56 against operation. Two slide bars 63 and 70 are connected together by an arm 72 pivoted as at 73 to the slide bar 63 and as at 74 to the slide bar 70. An arm 75 is pivotally connected as at 76 midway of the arm 72 at one end and at 77 it is also pivotally connected to an extension 78 of a gear segment 79 pivoted as at 80 to the interior frame of the door 20. A worm gear A meshes with the gear segment 79 and is connected to the drive shaft 81 of a reversible electric motor 82. A rod 83 is pivoted as at 84 to extension 78 of the gear segment 79 and to one end 85 of a bell crank 86 pivoted as at 87 to the inside of the frame of the door 20. The other arm 88 of the bell crank 86 is pivoted as at 89 to a flattened rod 90 which passes through a slot in a guide 91 mounted to the inside of the frame of the door 20 and has a flange 92 provided with a hole 93 through which passes the push rod 41. Collar 95 is affixed to the push rod 41 to be engaged by the flange 92 to permit the push button to be drawn downwardly upon actuation of the bell crank 86 by the electric motor 82 in one direction and thereby to dog or latch the door locking mechanism so that it cannot be opened by either the handle 20 or any outside handle.

Referring now more particularly to FIGURE 2, it will be noted that a lock 100 actuated by a key 101 is connected in series with a source of electric power 102, the reversible motor 82 and through line 104 back to the lock 100 so that the turning of the key in one direction will drive the motor 82 in one direction to lock the door and window and in the other direction, drive the motor 82 so as to unlock the door or window.

Referring now more particularly to FIGURE 3, there is illustrated the above-identified mechanism of this invention in the locked position in which it will be noted that the flattened portions 36A and 51A of the rod and shaft 36 and 51 are securely held in the bifurcated ends of the slides 63 and 70 respectively.

Referring to FIGURES 5 and 6, these figures are particularly pertinent to the window locking mechanism and show that if it is desired to leave the window in a partially open position as for ventilation upon locking of the door and window, this can be accomplished as the flattened portion 36A rather than entering the bifurcated portion 64 of the slide 63 may be engaged by a flat end 63A of the slide 63 which will turn the flattened portion 36A, thereby moving the window a slight amount so as to securely engage the flattened portion 36A directly across the flats of the flattened portion 63A.

Referring now more particularly to FIGURE 7, it will be noted that there is provided therein another embodiment wherein the flattened portion 36A is replaced by a star shaped portion 36B which will act similarly to the portion 36A in FIGURES 5 and 6 except that one arm 36C of the flattened portion 36B is adapted to enter the bifurcated portion 64 as the slide 63 approaches latching position for the window.

Referring now more particularly to FIGURE 4, this figure is applicable to either the door or window actuating mechanism and shows how the handle 110 which may be either the handle 37 or the handle 50 is mounted by an escutcheon 111 against the interior finished panel 112 by a coil spring 113. The channel 114 may be either the channel 60 or 67 and the slide 115 may be either the slide 63 or 70, while 116 is more particularly adaptable to the collar of the shaft 51 which may be attached to an outside door operating handle 118 mounted on the exterior of the door 20.

The above-described device thus operates to lock both the window and door in response to the turning of the key 101 by simply energizing the electromotor 82 so as to engage the slides 63 and 70 with the flattened portions 36A or 51A of the rods 36 and 51 or to unlock both the window and the door upon reverse turning of the key, and it is noted that the window can be locked in substantially any desired position from fully open to completely closed.

While there has been described what is at present considered a preferred embodiment of the present invention, it will be appreciated by those skilled in the art that various changes and modifications can be made therein.

I claim:

1. A locking device for a door and window, having a conventional latch, each of which is controlled by a rotary shaft comprising: a flattened portion on each of said shafts; a pair of shaft locking mechanisms each movable into dogging engagement with said flattened portions in one position and out of dogging engagement therewith in another position, said shaft locking mechanism comprising slides, guide means for said slides and means interconnecting said slides for joint operation, said shaft locking mechanism also being interconnected with the conventional door latch to lock or unlock said latch; a single electrically actuated mechanism for controlling said shaft locking mechanisms operably connected thereto and a key actuated switch for actuating said electrically actuated mechanism to move said locking mechanisms into or out of dogging position.

2. The device as set forth in claim 1 in which said door is conventionally provided with a locking push down rod and in which said shaft locking mechanisms are also interconnected with said push down rod.

3. A device as set forth in claim 1 in which said shaft locking mechanisms comprise slides, a guide means for said slides and means interconnecting said slides for joint operation; and each of said slides is provided with a bifurcated end adapted to engage the associated flattened portion of the associated shaft; the window controlling slide being provided with a flattened end adjacent its associated flattened portion of the window controlling shaft; and in which said electrically controlled mechanism comprises a reversible electrical motor having a driven shaft, a gear attached to said driven shaft; a gear segment meshing with said gear and a shaft interconnecting said slides with said gear segment.

4. A device as set forth in claim 3 in which said reversible electric motor is provided with a power source, a switch and a key operating said switch all in series for locking or unlocking in response to turning of said key.

5. A device as set forth in claim 4 in which said shaft locking mechanisms are also interconnected with the conventional door latch to lock or unlock said latch.

References Cited

UNITED STATES PATENTS

| 1,523,174 | 1/1925 | Comeau | 70—252 |
| 2,777,316 | 1/1957 | Mello | 70—177 |
| 3,054,282 | 9/1962 | Bacon | 70—264 |

MARVIN A. CHAMPION, *Primary Examiner.*

R. L. WOLFE, *Assistant Examiner.*

U.S. Cl. X.R.

70—263